United States Patent [19]

Schmidt et al.

[11] Patent Number: 4,681,922

[45] Date of Patent: Jul. 21, 1987

[54] THERMOPLASTIC POLYSILOXANE-POLYESTER (CARBONATE) BLOCK COPOLYMERS, THEIR PREPARATION AND USE

[75] Inventors: Manfred Schmidt; Winfried Paul; Dieter Freitag, all of Krefeld; Dietrich Rathmann, Leverkusen, all of Fed. Rep. of Germany

[73] Assignee: Bayer Aktiengesellschaft, Leverkusen, Fed. Rep. of Germany

[21] Appl. No.: 676,483

[22] Filed: Nov. 29, 1984

[30] Foreign Application Priority Data

Dec. 13, 1983 [DE] Fed. Rep. of Germany ....... 3344911

[51] Int. Cl.$^4$ ..................... C08G 77/40; C08G 63/24; C08G 63/46
[52] U.S. Cl. .................................... 525/474; 524/500; 524/537; 524/539; 524/540; 525/439; 525/446; 528/26; 528/29; 528/33
[58] Field of Search ...................... 525/446, 474, 439; 528/26

[56] References Cited

U.S. PATENT DOCUMENTS

| | | | |
|---|---|---|---|
| 3,701,815 | 10/1972 | Matzner et al. | 260/824 |
| 3,749,757 | 7/1973 | Marzocchi | 525/446 |
| 3,935,154 | 1/1976 | Cawley | 525/446 |
| 3,994,988 | 11/1976 | Lavrin | 525/474 |
| 4,496,704 | 1/1985 | Ginnings | 525/446 |
| 4,539,379 | 9/1985 | Hallgren | 525/446 |

FOREIGN PATENT DOCUMENTS 0142048  11/1980  Japan ................................. 525/439

Primary Examiner—Wilbert J. Briggs, Sr.
Attorney, Agent, or Firm—Connolly & Hutz

[57] ABSTRACT

Siloxane/polyester (carbonate) block copolymers comprising wholly aromatic polyester or polyestercarbonate units and from 0.5 to 7.5% by weight of polysiloxane blocks, exhibit an improved melt flowability without impairment of the heat stability.

7 Claims, No Drawings

THERMOPLASTIC POLYSILOXANE-POLYESTER (CARBONATE) BLOCK COPOLYMERS, THEIR PREPARATION AND USE

Polysiloxane-polyester block copolymers with siloxane contents of 90 to 10% by weight, based on the block copolymer, are described in German Offenlegungsschrift No. 2,001,945 (U.S. Pat. No. 3,701,815). These block copolymers are elastomers or rigid copolymers whose heat stabilities are markedly lower than that of the polyesters on which they are based.

Polysiloxane-polyestercarbonate block copolymers with 45 to 60% by weight of polysiloxane segments are described in German Offenlegungsschrift No. 2,640,241. These polymers are elastomeric thermoplasts of improved tensile strength at heat sterilization temperatures, but the heat stabilities of these block copolymers are substantially lower than those of the polyestercarbonates not containing polysiloxane.

Aromatic polyesters based on bisphenols and isophthalic/terephthalic acid are known and are described, for example, by W. M. Eareckson, J. Polym. Sci. XL, 399–406 (1959), or in French Patent Specification No. 1,177,517, U.S. Pat. No. 3,351,624 and German Patent Specification Nos. 2,714,544 and 2,758,030. Aromatic polyestercarbonates based on bisphenols, carbonic acid and isophthalic/terephthalic acid are also known and are described, for example, in European Patent Specification No. 10,840, German Patent Specifications Nos. 3,016,019 and 2,714,544 and U.S. Pat. No. 3,207,814. On account of their excellent properties, these polycondensates are employed on all cases where high heat stability and toughness are desired.

Aromatic polyesters and polyestercarbonates frequently give rise to processing difficulties on account of high softening points and relatively high viscosities in the melt. It is therefore of considerable technical interest to increase the flowability of the polymer melt without having an adverse influence on the other advantageous technological properties of the polymers.

Numerous experiments have been undertaken to solve this problem; on the one hand, the formation of alloys with other thermoplasts has been proposed (German Offenlegungsschrift No. 2,333,017, Japanese Published Patent Application No. 75/5,444 and German Offenlegungsschrift No. 2,646,728), and on the other hand, the admixing of low-molecular adjuvants is recommended (Japanese Published Patent Applications Nos. 74/34,546, 74/86,433 and 76/37,146).

Although both methods improve the flowability of the aromatic polyester moulding compositions, other essential technological properties, such as the heat stability in particular, are simultaneously impaired. The object of the invention was therefore to achieve a better thermoplastic processability of aromatic polyesters or polyestercarbonates by modification of the polymer molecule, without impairment of the heat stability.

The invention therefore relates to siloxanepolyester(carbonate) block copolymers with repeat structural units of the formulae

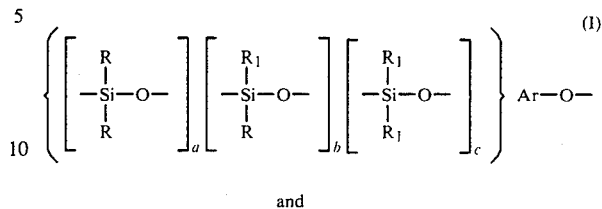

and

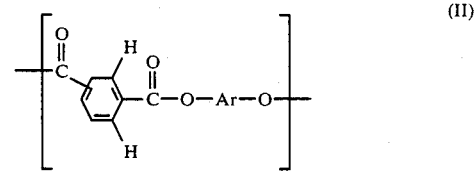

or

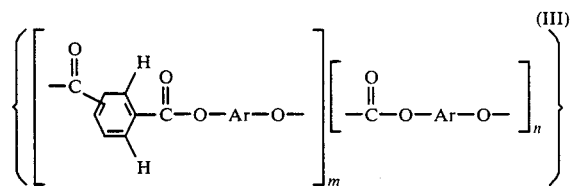

wherein
R and $R_1$ each denote optionally halogen-substituted $C_1$–$C_{20}$-alkyl, $C_2$–$C_6$-alkenyl, $C_6$–$C_{14}$-aryl, $C_7$–$C_{15}$-aralkyl or $C_7$–$C_{15}$-alkaryl,
a, b and c together denote a number from 10 to 100, preferably 20 to 80,
Ar denotes a mononuclear or polynuclear aromatic radical having 6 to 30 C atoms and
the ratio m/n is, preferably 1:9 to 9:1, in particular 3:7 to 7:3, characterized in that the structural units I represent 0.5 to 7.5 and preferably 1 to 5% by weight and the sum of the structural units II and III represents 99.5 to 92.5 and preferably 99 to 95% by weight of the siloxane-polyester(carbonate) block copolymer (disregarding the terminating groups), and ratio of the isophthalic acid units to the terephthalic acid units in the structural units II and III is 3:7 to 7:3 and preferably 4.5:5.5 to 5.5:4.5.

The lengths of the blocks II and III result from the number and the lengths of blocks I and from the condition I+II+III=100%.

The siloxane-polyester(carbonate) block copolymers according to the invention are obtained by reacting at least one bisphenol of the formula $$\text{HO—Ar—OH} \tag{IV}$$

and at least one diorganosiloxane of the formula

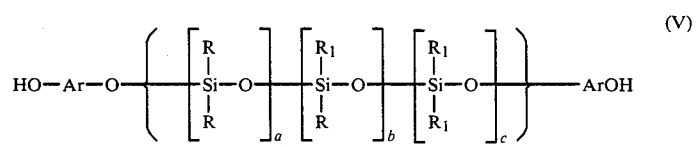

with mixtures of isophthalic and terephthalic acid dichlorides and, if appropriate, with phosgene in a two-phase system consisting of an aqueous alkali solution and a water-immiscible organic solvent, in a phase boundary reaction, in the presence of a catalyst and, if appropriate, of chain stoppers, branching agents and antioxidants, Ar, R, $R_1$, a, b and c having the abovementioned meanings.

Particularly preferred diphenols of the formula (IV) are hydroquinone, resorcinol and those in which Ar corresponds to the formula

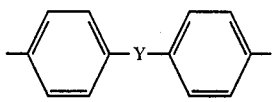

wherein

Y denotes a single bond, an alkylene or alkylidene radical having 1-7 C atoms, a cycloalkylene or cycloalkylidene radical having 5-12 C atoms, —O—, —S—,

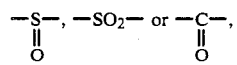

and their derivatives alkylated on the nucleus and halogenated on the nucleus, for example dihydroxybiphenyls, bis(hydroxyphenyl)alkanes, bis(hydroxyphenyl)-cycloalkanes, bis(hydroxyphenyl)sulphides, bis(hydroxyphenyl)ethers, bis(hydroxyphenyl)ketones, bis(hydroxyphenyl)sulphoxides, bis(hydroxyphenyl)sulphones and α,α'-bis(hydroxyphenyl)diisopropylbenzenes, and their compounds alkylated on the nucleus and halogenated on the nucleus, particular examples being bisphenol A, tetramethylbisphenol A, 1,1-bis(4-hydroxyphenyl)isobutane, 1,1-bis(4-hydroxyphenyl)cyclohexane, 4,4'-dihydroxydiphenyl sulphide, 4,4'-dihydroxybiphenyl, 4,4'-dihydroxydiphenyl sulphone and also their dihalogenated and tetrahalogenated derivatives. Bisphenol A is particularly preferred.

The chain stoppers which are preferably used are phenol, alkylphenols having $C_1-C_{12}$-alkyl groups, halogenated phenols, hydroxybiphenyl, naphthols, chlorocarbonic acid esters of phenolic compounds of these types, and chlorides of aromatic monocarboxylic acids which can be optionally substituted by $C_1-C_{22}$-alkyl groups and halogen atoms, in quantities of 0.1 to 10 mol % (based on diphenols in the case of phenols, and based on acid dichloride in the case of acid chlorides).

The branching agents which can preferably be used are carboxylic acid chlorides containing 3 or more functional groups or phenols containing 3 or more hydroxyl groups, in quantities of 0.01 to 1 mol %, based on dicarboxylic acid chlorides used or diphenols used.

0.5 to 5 mol % (based on the total number of moles of diphenols and diorganosiloxanes used) of quaternary ammonium or phosphonium compounds or tertiary amines can be introduced into the aqueous alkaline phase as a catalyst for the polycondensation reaction.

Preferred catalysts correspond to the formula

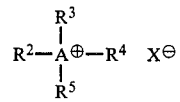

wherein

A denotes a nitrogen or phosphorus atom,

X denotes chlorine or bromine and $R^2$, $R^3$, $R^4$ and $R^5$ denote $C_1-C_{20}$-alkyl, $C_5-C_{10}$-cycloalkyl, $C_7-C_{30}$-alkaryl or $C_7-C_{30}$-aralkyl, and two of the radicals $R^2$ to $R^5$ are optionally linked, or to the formula

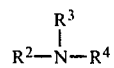

wherein $R^2$, $R^3$ and $R^4$ have the abovementioned meanings and two of the radicals $R^2$ to $R^4$ are optionally linked.

Particularly preferred catalysts are tetrabutylammonium bromide, triphenylbenzylphosphonium bromide and N-ethylpiperidine.

Examples of preferred organic water-immiscible solvents are methylene chloride, chloroform, trichloroethylene and tetrachloroethylene, tetrachloroethanes, chlorobenzene, dichlorobenzenes and mixtures thereof.

An advantageous procedure consists in dissolving the bisphenol in an aqueous alkaline phase, adding the catalyst, covering the aqueous solution with the organic solvent and introducing the diorganopolysiloxane, for example dissolved in the organic solvent already used, the chain stopper, the isophthalic/terephthalic acid dichloride mixture, for example dissolved in the organic solvent already used, and, if appropriate, phosgene, in any desired order or simultaneously.

The reaction is carried out with intensive stirring and with the exclusion of atmospheric oxygen, at 0° to 40° C. and preferably 15° to 30° C.

The reaction takes about 10–60 minutes. The organic phase is isolated and washed and the polymer is isolated by evaporation of the organic solvent, for example in an evaporation extruder.

The block polymers according to the invention have an average molecular weight $\bar{M}_w$ (weight-average, determined by ultracentrifugation or light scattering measurement) of 10,000 to 200,000 and preferably of 15,000 to 50,000. Their relative solution viscosities $\eta_{rel}$ are 1.15 to 2.15 and preferably 1.20 to 1.50, measured in 0.5% by weight solution in methylene chloride at 25° C.

The aromatic polyesters and polyestercarbonates modified according to the invention with siloxane blocks show a substantially improved melt flowability and an improved mould-release behaviour, compared with the unmodified aromatic polyesters and polyestercarbonates without impairment of the heat stability.

This facilitates the technical use of the siloxane-modified modified polyesters or polyestercarbonates according to the invention for the preparation of moulding compositions by thermoplastic processing procedures.

If appropriate, dyestuffs, pigments, stabilizers, flame-proofing agents or fillers, such as glass fibres, can also be added to the block copolymers according to the invention without thereby impairing the improvement, brought about by the modification with siloxane, in the melt flow behaviour and mould release.

The block copolymers according to the invention are used in all cases where mouldings are produced fully automatically in the injection moulding process, in large piece numbers, with short cycle times, for example in the sector of electrotechnical equipment manufacture, for example for the production of connector strips, coil formers, complicated housings and switch boxes.

The improvement in the mould-release behaviour is determined by measuring the mould-release forces required to release injection-moulded compositions from the mould. To do this, the pressure occurring in the oil cylinder of the ejection system during mould release is displayed via an optical indicator which simultaneously writes. This method makes it possible to find the pressure which builds up in the ejection system when a conical cylinder (length 35 mm, diameters 40 mm and 42 mm, wall thickness 2 mm) is filled with the polymer at a particular mould temperature.

To measure the melt flowability, spiral-shaped strips of dimensions 2 mm × 8 mm are produced on an injection-moulding machine of the Arburg E 270 type (manufactured by Arburg), under a pressure of 110 bar and at extrusion temperatures of 340° to 360° C., the cross-sections of the conical rod outlet being 6 and 8 mm². The moulding temperature is 90° C. The length of the spiral-shaped strips obtained is a proportionate measure of the melt flowability of the polymer.

To check the molecular degradation, the relative solution viscosities of the polymers were measured in each case after injection moulding of the flat spirals, in order to ensure that no apparent improvement in flowability is simulated as a result of molecular weight reduction by molecular degradation.

EXAMPLE 1

2214 g (9.71 mol) of bisphenol A were dissolved, under a nitrogen atmosphere, in 1827.4 g (21.38 mol) of 46.8% by weight aqueous sodium hydroxide solution and 56 liters of distilled water.

32.2 g (1 mol %, based on bisphenol) of tetrabutylammonium bromide, 11.7 liters of methylene chloride and 6.3 liters of chlorobenzene were then added, with stirring.

A solution of 179 g (0.20 mol) of the diorganosiloxane of the formula V/1

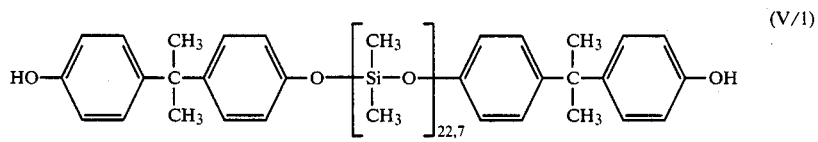
(V/1)

in 1421 g of chlorobenzene was introduced into this reaction mixture, with intensive stirring.

At a temperature of 20° to 25° C., a solution of 1015 g (5 mol) of terephthalic acid dichloride, 1015 g (5 mol) of isophthalic acid dichloride and 119.5 g of p-isooctylphenol (5.8 mol %, based on the number of moles of bisphenol A plus diorganosiloxane) in 3045 g of chlorobenzene was then introduced into the reaction mixture over a period of 2 minutes, with stirring. The reaction was allowed to continue for about 50 minutes at pH=11-12, the organic phase was isolated and washed until free of electrolyte, and the resulting polymer was isolated after concentration of the washed organic solution by means of an evaporation extruder (composition temperature: 325° C.).

This gave 3.8 kg of a siloxane-polyester block copolymer with a relative solution viscosity $\eta_{rel}$ of 1.272. The content of dimethylsiloxane structures was 4.4% by weight (determined by NMR analysis ).

EXAMPLE 2

A siloxane-polyester block copolymer was synthesized analogously to the procedure given in Example 1, but the weights were changed as follows:

2254.9 g (9.89 mol) of bisphenol A and 19.7 g (0.022 mol) of the diorganosiloxane (V/1), dissolved in 1582 g of chlorobenzene, were introduced into the reaction mixture, the nature and quantities of the other reactants remaining unchanged. After analogous working-up, 3.9 kg of a siloxane-polyester block copolymer with a relative solution viscosity $\eta_{rel}$ of 1.268 were obtained. The content of dimethylsiloxane structure was 0.5% by weight (determined by NMR analysis).

EXAMPLE 3

A siloxane-polyester block copolymer was synthesized analogously to the procedure given in Example 1, but the weights were changed as follows:

2192.1 g (9.61 mol) of bisphenol A and 268.5 g (0.30 mol) of the diorganosiloxane (V/1), dissolved in 2130 g of chlorobenzene, were introduced into the reaction mixture, the nature and quantities of the other reactants remaining unchanged. After analogous working-up, 3.8 kg of a siloxane-polyester block copolymer with a relative solution viscosity $\eta_{rel}$ of 1.273 were obtained. The content of dimethylsiloxane structures was 6.7% by weight (determined by NMR analysis).

COMPARATIVE EXAMPLE 1

An aromatic polyester based on bisphenol A, isophthalic acid/terephthalic acid (1:1) and isooctylphenol as a chain stopper was prepared analogously to the procedure given in Example 1, the relative solution viscosity $\eta_{rel}$ of the polyester being 1.273 (used of 3.9 mol % of isooctylphenol).

| | | | | | Length of flow spirals | |
|---|---|---|---|---|---|---|
| | | Comparison of technological properties of polymers | | | | |
| | $\eta_{rel}$ of | Notched impact strength[1] (at 23° C.) | Impact strength[1] (at 23° C.) | Heat stability according to | (mm) at: | |
| Example | granules | (kJ/m²) | (kJ/m²) | Vicat-B[2] | 340° C. | 360° C. |
| 1 | 1.272 | 23-incipient break | n.b.[3] | 189–190° C. | 210 | 260 |
| 2 | 1,268 | 22 | n.b. | 189–190° C. | 132 | 194 |
| 3 | 1,273 | 24-incipient break | n.b. | 190° C. | 242 | 281 |
| Comparative Example 1 | 1,273 | 23 | n.b. | 190° C. | 107 | 176 |

[1]Notched impact strength and impact strength corresponding to DIN 53 453
[2]Vicat-B temperature according to DIN 53 460
[3]n.b. = not broken

| Comparison of the mould-release behaviour | | |
|---|---|---|
| Example | Minimum measured mould-release force (bar) | at temperature (°C.) |
| 1 | 13 bar | 179 |
| 2 | 19 bar | 182 |
| 3 | 11 bar | 176 |
| Comparative Example 1 | 32 bar | 185 |

EXAMPLE 4

2153.7 g (9.446 mol) of bisphenol A were dissolved, under a nitrogen atmosphere, in 1795.6 g (20.2 mol) of 45% by weight aqueous sodium hydroxide solution and 64 liters of distilled water.

13.5 ml of N-ethylpiperidine (2 mol %, based on bisphenol), 10.3 liters of methylene chloride and 11.2 liters of chlorobenzene were then added, with stirring.

A solution of 138.73 g (0.155 mol) of the diorganosiloxane according to Example 1 in 1413 g of chlorobenzene was introduced into this reaction mixture, with intensive stirring.

At a temperature of 20° to 25° C., a solution of 421.2 g (2.075 mol) of terephthalic acid dichloride, 421.2 g (2.075 mol) of isophthalic acid dichloride and 86.0 g (4.15 mol %, based on the number of moles of bisphenol A and diorganosiloxane) of p-isooctylphenol in 1264 g of chlorobenzene was then introduced into the reaction mixture over a period of 5 minutes, with stirring. The reaction was allowed to proceed for ½ hour at pH 11–12, 840 g of 45 % aqueous sodium hydroxide solution were added and 890 g (9 mol) of phosgene were passed in at pH 13 over a period of 15 minutes. The pH was kept at 13 during the phosgene introduction by the addition of 100 g of 45% by weight aqueous sodium hydroxide solution. The reaction was allowed to continue for 15 minutes, the organic phase was washed until free of electrolyte, and the polymer was isolated as described in Example 1.

This gave 2.8 kg of a siloxane-polyestercarbonate block copolymer with a relative solution viscosity $\eta_{rel}$ of 1.276. The content of dimethylsiloxane structures was 4.3% by weight (determined by NMR analysis). Content of ester groups in the polyestercarbonate block portion: 50.1 mol% (determined by total saponification).

COMPARATIVE EXAMPLE 2

2280 g (10 mol) of bisphenol A were dissolved, under a nitrogen atmosphere, in a solution of 808 g (20.2 mol) of sodium hydroxide in 64 liters of distilled H$_2$O. 13.5 ml (2 mol %, based on bisphenol A) of N-ethylpiperidine, 10.3 liters of methylene chloride and 11.2 liters of chlorobenzene were added, with stirring. A solution of 421.2 g (2.075 mol) of terephthalic acid dichloride, 421.2 g (2.075 mol) of isophthalic acid dichloride and 82.0 g (4.0 mol %, based on bisphenol A) of p-isooctylphenol in 1264 g of chlorobenzene was introduced into this reaction mixture over a period of 5 minutes, with intensive stirring. The reaction was allowed to proceed for ½ hour at pH 11–12, 7.5 liters of 5% by weight aqueous sodium hydroxide solution were added and 890 g (9 mol) of phosgene were passed in at pH 13 over a period of 15 minutes. A pH of 13 was maintained by the addition of 300 g of 45% by weight aqueous sodium hydroxide solution. The reaction was allowed to continue for 15 minutes, the organic phase was isolated and washed as in Example 4 and working-up was carried out analogously. This gave 3.0 kg of an aromatic polyestercarbonate containing 50 mol % of carbonate structures and 50 mol % of isophthalate/terephthalate structures, the ratio of isophthalate to terephthalate being 1:1.

The relative solution viscosity of the polymer, $\eta_{rel}$, was 1.278.

| Comparison of technological properties of polymers | | | | | | |
|---|---|---|---|---|---|---|
| Example | $\eta_{rel}$ of granules | Notched impact strength[1] (at 23° C.) (kJ/m$^2$) | Impact strength[1] (at 23° C.) (kJ/m$^2$) | Heat stability according to Vicat-B[2] | Length of flow spirals (mm) at: | |
| | | | | | 340° | 360° |
| 4 | 1.276 | n.b.[3] | 35 | 169° C. | 460 | 640 |
| Comparative Example 1 | 1.278 | n.b. | 34 | 169–170° C. | 320 | 570 |

[1]According to DIN 53 453
[2]According to DIN 53 460
[3]n.b. = not broken

| Comparison of the mould-release behaviour | | |
|---|---|---|
| Example | Minimum measured mould-release force (bar) | at temperature (°C.) |
| 4 | 8 | 159 |
| Comparative Example 2 | 36 | 153 |

We claim:
1. A siloxane-polyester(carbonate) block copolymer with repeat structural units of the formulae

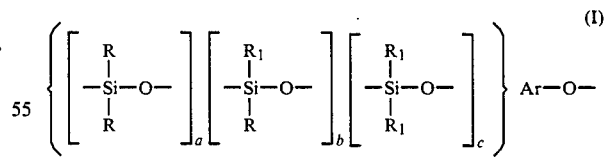

(I)

and

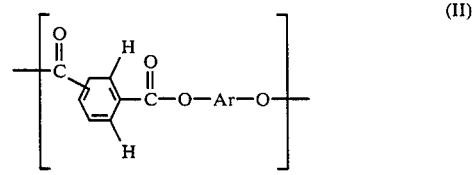

(II)

or

-continued

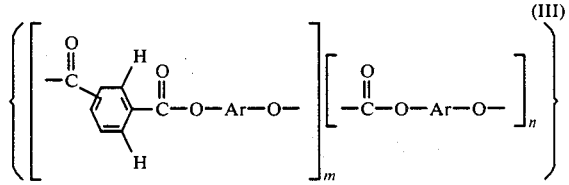

wherein
R and $R_1$ each denote optionally halogen-substituted $C_1$-$C_{20}$-alkyl, $C_2$-$C_6$-alkenyl, $C_6$-$C_{14}$-aryl, $C_7$-$C_{15}$-aralkyl or $C_7$-$C_{15}$-alkaryl, a, b and c together denote a number from 10 to 100 and Ar denotes a mononuclear or polynuclear aromatic radical having 6 to 30 C atoms, and the ratio m/n is 1:9 to 9:1, characterized in that the structure units I represent 0.5 to 7.5% by weight and the structural units II or III represent 99.5 to 92.5% by weight of the siloxane-polyester-(carbonate) block copolymer (disregarding the terminating groups), and the ratio of the isophthalic acid units to the terephthalic acid units in the structural units II and III is 3:7 to 7:3.

2. A siloxane-polyester(carbonate) block copolymer according to claim 1, wherein the structural units I represent 1 to 5% by weight and the structural units II and III represent 99 to 95% by weight, the ratio m/n is 1:9 to 9:1 and the ratio of the isophthalic acid units to the terephthalic acid units is 4.5:5.5 to 5.5:4.5.

3. A siloxane-polyester(carbonate) block copolymer according to claim 1, wherein
R and $R_1$ denote methyl,
a, b and c together denote a number from 20 to 80,
the ratio m/n is 3:7 to 8:2, and
Ar denotes the radical of bisphenol A,
and the ratio of the isophthalic acid units to the terephthalic acid units is 1:1.

4. A process for the preparation of the siloxane-polyester-(carbonate) block copolymers according to claim 1, characterized in that at least one bisphenol of the formula HO—Ar—OH and at least one diorganosiloxane of the formula

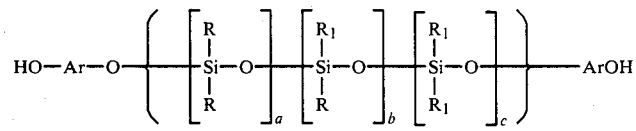

are reacted with mixtures of isophthalic and terephthalic acid dichlorides in a two-phase system consisting of an aqueous alkali solution and a water-immiscible organic solvent, in a phase boundary reaction, in the presence of a catalyst Ar, R, $R_1$, a, b and c having the meanings given in claim 1.

5. The use of the siloxane-polyester(carbonate) block copolymers according to claim 1 for the production of mouldings.

6. A process in accordance with claim 4, wherein the reaction mixture further comprises phosgene.

7. A process in accordance with claim 4, wherein the reaction mixture further comprises chain stoppers, branching agents and antioxidants.

* * * * *